US010628498B2

United States Patent
Avkd et al.

(10) Patent No.: US 10,628,498 B2
(45) Date of Patent: Apr. 21, 2020

(54) INTEREST-BASED MESSAGE-AGGREGATION ALTERATION

(71) Applicant: International Business Machines Corporation, Armonk, NY (US)

(72) Inventors: Sivakumar Avkd, Visakhapatnam (IN); Prasad P. Purandare, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/604,703

(22) Filed: May 25, 2017

(65) Prior Publication Data

US 2017/0262541 A1 Sep. 14, 2017

Related U.S. Application Data

(63) Continuation of application No. 14/963,275, filed on Dec. 9, 2015, now Pat. No. 9,734,248.

(51) Int. Cl.
*G06F 16/951* (2019.01)
*H04L 12/58* (2006.01)
(Continued)

(52) U.S. Cl.
CPC ...... *G06F 16/951* (2019.01); *G06F 16/24578* (2019.01); *G06F 16/9535* (2019.01);
(Continued)

(58) Field of Classification Search
CPC combination set(s) only.
See application file for complete search history.

(56) References Cited

U.S. PATENT DOCUMENTS 6,981,214 B1 12/2005 Miller et al.
8,725,716 B1 5/2014 Riley et al.
(Continued)

FOREIGN PATENT DOCUMENTS

EP 1630703 A1 3/2006
JP 2009151391 A * 7/2009

OTHER PUBLICATIONS

Anonymous, "Acceptability indicators in emails," An IP.com Prior Art Database Technical Disclosure, IP.com No. 000212197, 5 pages, IP.com Electronic Publication: Nov. 4, 2011.
(Continued)

*Primary Examiner* — Tuankhanh D Phan
(74) *Attorney, Agent, or Firm* — Nolan M. Lawrence

(57) ABSTRACT

A communication engine collects a first topic of a first user. The communication engine retrieves a message-aggregation from a content delivery repository. The message-aggregation includes a plurality of messages and a title. The message-aggregation is generated by a content provider before retrieval. The communication engine detects a relevant first message in the plurality of messages based on the first topic. The communication engine alters the message-aggregation such that the relevant first message is distinguished from the plurality of messages other than the first message. The alteration is based on the detected relevant first message. The communication engine also alters the title of the message-aggregation based on the detected relevant first message.

5 Claims, 4 Drawing Sheets

(51) Int. Cl.
*H04L 12/18* (2006.01)
*G06F 16/9535* (2019.01)
*G06F 16/2457* (2019.01)

(52) U.S. Cl.
CPC .............. *H04L 12/18* (2013.01); *H04L 51/04* (2013.01); *H04L 51/32* (2013.01)

(56) References Cited

U.S. PATENT DOCUMENTS

| | | | |
|---|---|---|---|
| 2003/0233422 A1* | 12/2003 | Csaszar | G06Q 10/107 709/206 |
| 2006/0048042 A1* | 3/2006 | Sembower | G06F 17/30867 715/255 |
| 2007/0220411 A1 | 9/2007 | Hauser | |
| 2007/0282954 A1 | 12/2007 | Kim et al. | |
| 2008/0201643 A1 | 8/2008 | Nagaitis et al. | |
| 2009/0150497 A1 | 6/2009 | McAfee et al. | |
| 2013/0297576 A1 | 11/2013 | Christensen et al. | |
| 2014/0025842 A1 | 1/2014 | Li et al. | |
| 2014/0059443 A1* | 2/2014 | Tabe | H04L 51/32 715/738 |
| 2014/0181115 A1 | 6/2014 | Chen et al. | |
| 2014/0210702 A1 | 7/2014 | Peterson et al. | |
| 2014/0358521 A1* | 12/2014 | Mikutel | G06F 17/2705 704/9 |
| 2015/0213492 A1 | 7/2015 | Aleksandrovsky | |
| 2017/0034101 A1 | 2/2017 | Kumar et al. | |

OTHER PUBLICATIONS

Bhatia et al. "UNAP: User-centric network-aware push for mobile content delivery." INFOCOM, 2009, pp. 2034-2042, Copyright 2009 IEEE.

Kurki et al. "Agents in delivering personalized content based on semantic metadata." Proc. 1999 AAAI Spring Symposium Workshop on Intelligent Agents in Cyberspace, pp. 84-93, Stanford, USA, 1999.

Avkd et al., "Interest-Based Message-Aggregation Alteration", U.S. Appl. No. 14/963,275, filed Dec. 9, 2015.

IBM, List of IBM Patents or Patent Applications Treated as Related, May 23, 2017, 2 pages.

* cited by examiner

INTEREST-BASED MESSAGE-AGGREGATION ALTERATION

BACKGROUND

The present disclosure relates to altering messages, more particular aspects relate to customizing broadcast emails.

Online activity may be mined to recognize and learn about a user. User behaviors may be determined from monitoring the online activity. User interests may be determined from monitoring the online activity. Retail industries may utilize behaviors and interests to target products at users. News industries may utilize behaviors and interests to provide more relevant stories to users.

SUMMARY

Embodiments of the present disclosure include a method, computer program product, and system for altering a message-aggregation to enhance user engagement. A communication engine collects a first topic of a first user. The communication engine retrieves the message-aggregation from a content delivery repository. The message-aggregation includes a plurality of messages and a title. The message-aggregation is generated by a content provider before retrieval. The communication engine detects a relevant first message in the plurality of messages based on the first topic. The communication engine alters the message-aggregation such that the relevant first message is distinguished from the plurality of messages other than the first message. The alteration is based on the detected relevant first message. The communication engine also alters the title of the message-aggregation based on the detected relevant first message.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
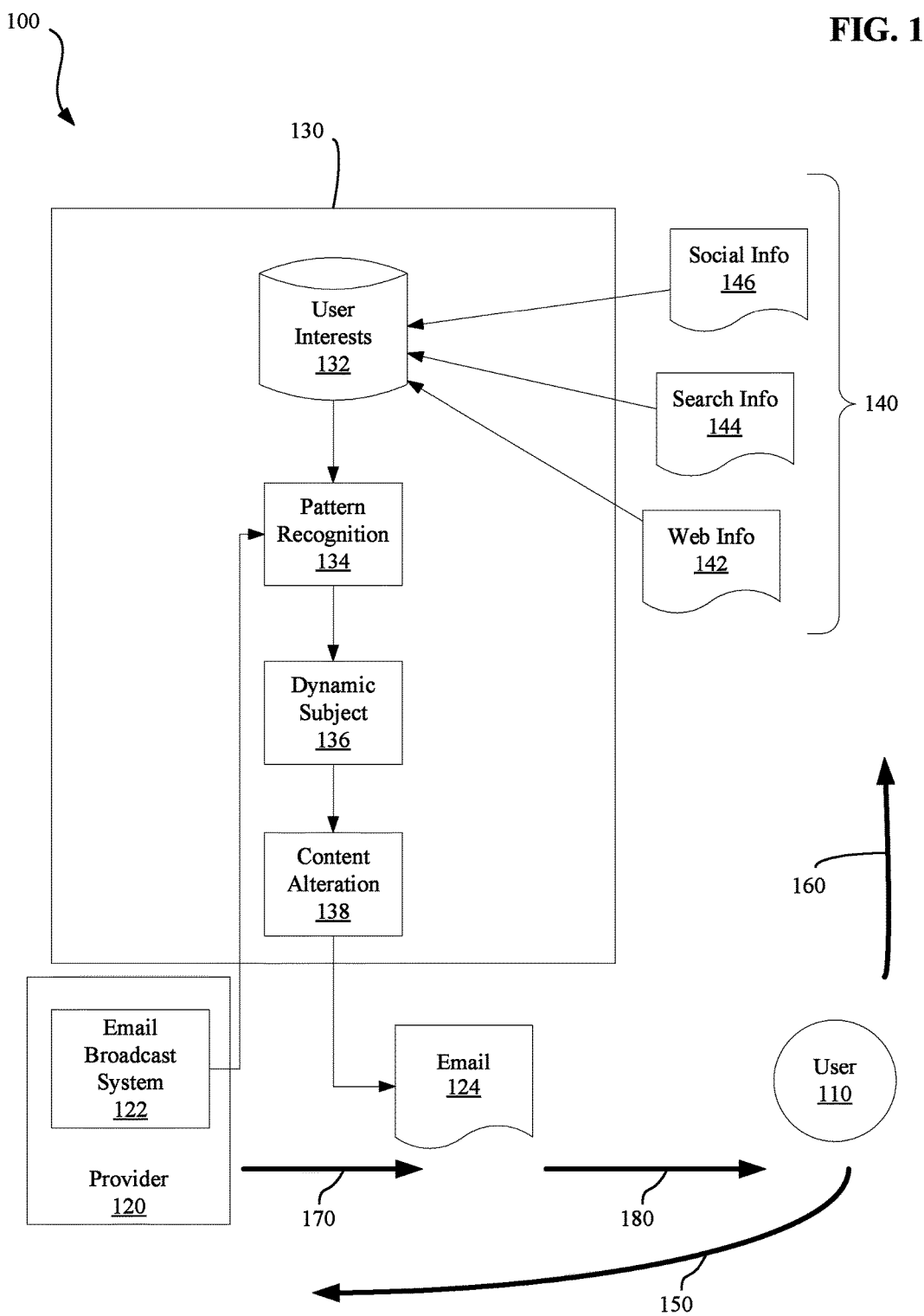
FIG. 1 depicts an example computing environment for enhancing engagement of recipients of message-aggregations consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to altering messages, more particular aspects relate to customizing broadcast emails. While the present disclosure is not necessarily limited to such applications, various aspects of the disclosure may be appreciated through a discussion of various examples using this context.

Content consumers (users) may utilize the Internet to seek out information that the users find interesting. A user may browse a variety of Internet sources, such as search engines, social networks, websites, smartphone apps, etc., to learn about a particular topic. A user may encounter a particular source of content from a content creator (provider) that is of interest to the user. The user may subscribe to the provider to be notified of new information from the provider through a message-aggregation. The message-aggregation may be stored by the provider in a content delivery repository and sent to subscribing users by a content delivery network. The message-aggregation may be a collection of messages (topics or articles). In a first example, a series of topics in a broadcast email are sent to subscribing users by an email server. In a second example, users may subscribe to a rich site summary broadcast (RSS) of articles and an RSS provider sends broadcasts containing a plurality of messages regarding the articles.

Users may also communicate their interest in particular topics with others by sharing their interests on social networking platforms (e.g., forums, blogs, etc.). Users may also receive message-aggregations from organizations to which they are members, such as a broadcast email sent from a particular user's company, RSS broadcasts from other providers, etc. A user may have a limited amount of time to scan through her communications for relevant content (e.g., users have work and social obligations, as well other email to read through).

Content creators (providers) may generate a profit from users by providing advertisements to the users as they consume content on a providers' Internet site (e.g., website). Providers may utilize message-aggregations to communicate with users and to direct users to the providers' websites. A message-aggregation may include a series of messages (topics) (e.g., an email containing some text and images). The series of topics may be all relatively closely related, such as features of databases (e.g., database creation, securing a database, increasing database performance, etc.). The series of topics may be related loosely, such as new technology articles (e.g., newest smartphones, automobile tire technology, latest health and fitness trackers, etc.). Messages containing high-quality topics may consume a significant amount of a provider's resources (e.g., for each message, a staff member may be employed to write the topics of the message to cover the content of the Internet site). To increase profitability, providers may need to generate messages that are targeted but do not consume undue resources to create.

Organizations may also send message-aggregations to employees (users) that include a variety of information. The organizational message-aggregation creators (organizational providers) may send message-aggregations to large teams and sub-teams within the organization. For example, an email contains a series of policy change summaries (and related links to policy changes) for policies within the organization. The policy changes may apply at varying degrees to the employees of the organization. Organizational providers may include within a single email topics directed at tens or hundreds of users with varying levels of experience and attention. An organizational provider may send a single message-aggregation that covers a large and often unrelated amount of information. The organizational providers may also be competing for attention with other message-aggregations that employees may receive. The success of the organization may depend upon the productivity of its users as well as the ability to ensure relevant information is disseminated effectively.

A broadcast-message reordering system (BRS) may customize message-aggregations. The BRS may increase the engagement of users that receive customized message-aggregations, leading to increased satisfaction. The BRS may customize message-aggregations to increase the relevance of a message-aggregation for users. First, the BRS may alter the order of topics within the message-aggregation to decrease distraction and place topics that are relevant above others. Second, the BRS may also customize the subject of a message-aggregation (e.g., title), making it easier for a user to determine the relevance of message-aggregations.

A BRS may also benefit providers of content. Providers may notice increased traffic—and correspondingly, increased revenue—from users that receive customized message-aggregations. Providers may retain users of their message-aggregations for a longer period of time (e.g., users may be less likely to unsubscribe to a broadcast email if the topics are relevant). The longer retention period may sustain viewership of users that continue to visit the websites of the provider. If a user experiences more satisfaction, the user may increase word-of-mouth traffic of other users to a provider's website. In some embodiments, the BRS may work with existing message-aggregations without any provider intervention, preventing any cost increases.

Organizations using the BRS may also see an increase in productivity as employees spend less time reading through message-aggregations searching for relevant information. Organizations may also disseminate more targeted content to employees, increasing knowledge retention. Users within the organization may benefit because they are less distracted and more well-informed. The message-aggregations may lead to increased knowledge sharing as users spend less time finding relevant information and more time discussing and sharing the found information. Organizations may also satisfy policy or organizational requirements to educate employees on large numbers of topics while maintaining user engagement. For example, each employee may be required to look at dozens of topics in a message-aggregation. By placing the most relevant information first, the employee may feel empowered to look at all of the information of an email.

FIG. 1 depicts an example computing environment 100 for enhancing engagement of recipients of message-aggregations consistent with embodiments of the present disclosure. The computing environment 100 may include a user 110 that has signed up for message-aggregations from a provider 120. The user may also perform other operations not directly related to the provider 120, such as viewing content on the Internet and sharing information related to content on the Internet. The provider 120 may be a content provider on the Internet and the message-aggregations may be one or more broadcast emails (emails) 124 from an email broadcast system 122 of the provider 120. The broadcast emails 124 may contain content, such as text and pictures, that covers a plurality of topics.

The user 110 may utilize a BRS 130 to increase relevance and engagement of broadcast emails 124 from the provider 120. The BRS 130 may be an application or a suite of applications, utilities, and local data-sources on a computer of the user 110. A computer that may be executing the BRS 130 may be similar to the computer depicted in FIG. 4. In some embodiments, the BRS 130 may partially or totally execute from a computer other than a computer of the user 110. The BRS 130 may include the following: a data-source of user interests 132; a pattern recognition engine 134; dynamic subject engine 136; and content alteration engine 138.

The user interests 132 may be a data-source (database) of information collected by a daemon or utility (not depicted) storing information relevant to the interests of the user 110. The user interests 132 may be gathered from online activity 140 of the user 110. The user activity 140 may include information from a web-browser 142 (e.g., the name and location of websites and articles that the user 110 has viewed). The user activity 140 may also include search information 144, such as the type of search queries the user has performed including keywords and search terms. The user activity 140 may also include social information 146 that relates to the membership and credentials to online accounts, such as the names and posts of the user 110 to online forums and bulletin boards and social networking websites.

The pattern recognition engine 134 may be a process that intercepts traffic from the broadcast email system 122 and scans message-aggregations for topics that match the interests stored in the user interests 132. The pattern recognition engine 134 may be a stand-alone daemon or utility that runs on the computer of the user 110. The pattern recognition engine 130 may be a plugin or enhancement to an email client of the user 110, and may operate upon email stored in the user's inbox. The pattern recognition engine 130 may utilize matching based on topics. For example, the pattern recognition engine 130 may scan the user activity 140 stored within the user interests 132 and assign keywords to one or more entries within the user activity. The pattern recognition engine 130 may also scan a message-aggregation and identify topics within the message-aggregation matching the assigned keywords (e.g., string matching, pattern matching, keyword matching, etc.). The pattern recognition engine 130 may rank the identified topics and assign a ranking based on the matching (e.g., ranking based on topic source, topic content, topic creation data).

The dynamic subject engine 136 may be a process that modifies message-aggregations to increase relevance to the user 110. The dynamic subject engine 136 may be a stand-alone daemon or utility that runs on the computer of the user 110. The dynamic subject engine 136 may be a plugin or enhancement to an email client of the user 110. The dynamic subject engine 136 may insert keywords into a subject (title) of a message-aggregation. The inserted keywords may be based on the identified topics from the pattern recognition engine 130. The inserted keywords may further be based on the ranking of the identified topics. The inserted keywords may indicate to the user 110 that the message-aggregation contains relevant information for her. In some embodiments, the dynamic subject engine 136 may save an unaltered version of the subject for viewing by the user 110.

The content alteration engine 138 may be a process that customized message-aggregations to increase relevance to the user 110. The content alteration engine 138 may be a stand-alone daemon or utility that runs on the computer of the user 110. The content alteration engine 138 may be a plugin or enhancement to an email client of the user 110. The content alteration engine 138 may utilize the identified topics as well as the ranking to alter the content of the message-aggregation. The content alteration engine 138 may alter the content by reordering the identified topics to increase relevance of the message-aggregation to the user 110. The reordering may place topics that match the user activity 140 of the user 110, such that the user is able to quickly identify and engage with content from the message-aggregation that is most relevant. In some embodiments, the content alteration engine 138 may save an unaltered version of the content.

In an example usage scenario of the computing environment 100, the user 110 begins by viewing content on a website of the provider 120. The user 110 is looking for information regarding "increasing fitness using gamification and wearables". While on the website of the provider 120 the user 110 may find some articles related to "gamification." The user 110 may also notice an offer from the provider 120 to sign up for a broadcast email. Based on the article related to "gamification" the user 110 may sign up (per 150) to receive broadcast email from the provider 150. The provider 120 may add the credentials given by the user 110 to the broadcast email system 122 such that future email may be sent to the user.

The user 110 may continue to search for information related to "increasing fitness using gamification and wearables" (per 160). The user 110 may generate user activity 140 while continuing her search (per 160). The user activity 140 may include search engine queries 144 such as "smart watches" and "finding motivation through gamification of fitness." The user activity 140 may also include web-pages 142 that the user has visited such as an Internet-based-encyclopedia article on "jogging and running." The user activity 140 may also include a post the user 110 has made to her social network 146 discussing "shoes" that the user prefers. The BRS 130 may store the user activity 140 into the user interests 132 on a computer of the user 110.

The broadcast email system 122 may generate and send a broadcast email 124 to the user 110 (per 170). The broadcast email 124 may contain a plurality of topics that are ordered as follows: "Sports Help Cardio", "Smartwatches Now Measure Blood-pressure", "Eating Pizza Releases Endorphins", and "Running Shoes with Motivational Step Tracking." The broadcast email 124 may also have a subject that reads "The latest news in fitness: Pizza." The BRS 130 may intercept the broadcast email 124 sent (per 170) and the pattern recognition engine 134 may scan the intercepted broadcast email 124. The pattern recognition engine 134 may identify relevant topics in the broadcast email 124. The relevant topics may be based on the user interests 132. The pattern recognition engine 134 may rate the topics of "Smartwatches Now Measure Blood-pressure" and "Running Shoes with Motivational Step Tracking" as a high relevancy. The pattern recognition engine 134 may rate the topic "Sports Help Cardio" as a medium relevancy. The pattern recognition engine 134 may rate the topic "Eating Pizza Releases Endorphins" as a low relevancy.

The dynamic subject engine 136 may analyze the relevant topics identified by the pattern recognition engine 134 and the subject of the broadcast email 124. The dynamic subject engine may replace the entire subject of the email 124 with the titles of one of the highly relevant topics (e.g., "The latest news in fitness: Pizza" is replaced with "Smartwatches Now Measure Blood-pressure"). The dynamic subject engine may replace part of the subject of the email 124 with one of the relevant topics (e.g. "The latest news in fitness: Pizza" is replaced with "The latest news in fitness: Running Shoes with Motivational Step Tracking").

The content alteration engine 138 may reorder the topics of the email 124 based on an analysis. The content alteration engine 138 may analyze the relevant topics identified by the pattern recognition engine 134. The content alteration engine 138 may also analyze the relevancy of the topics, such as what topics are more relevant than others. The content alteration engine 138 may also analyze the unaltered ordering of the email 124. The content alteration engine 138 may alter the order of the topics within the subject altered email. Based on the analysis the reordering may be as follows: "Running Shoes with Motivational Step Tracking", "Smartwatches Now Measure Blood-pressure", "Sports Help Cardio", and finally "Eating Pizza Releases Endorphins." The email 124 that now contains a new subject and an altered content, may be provided to the user 110 (per 180).

Figure 2:
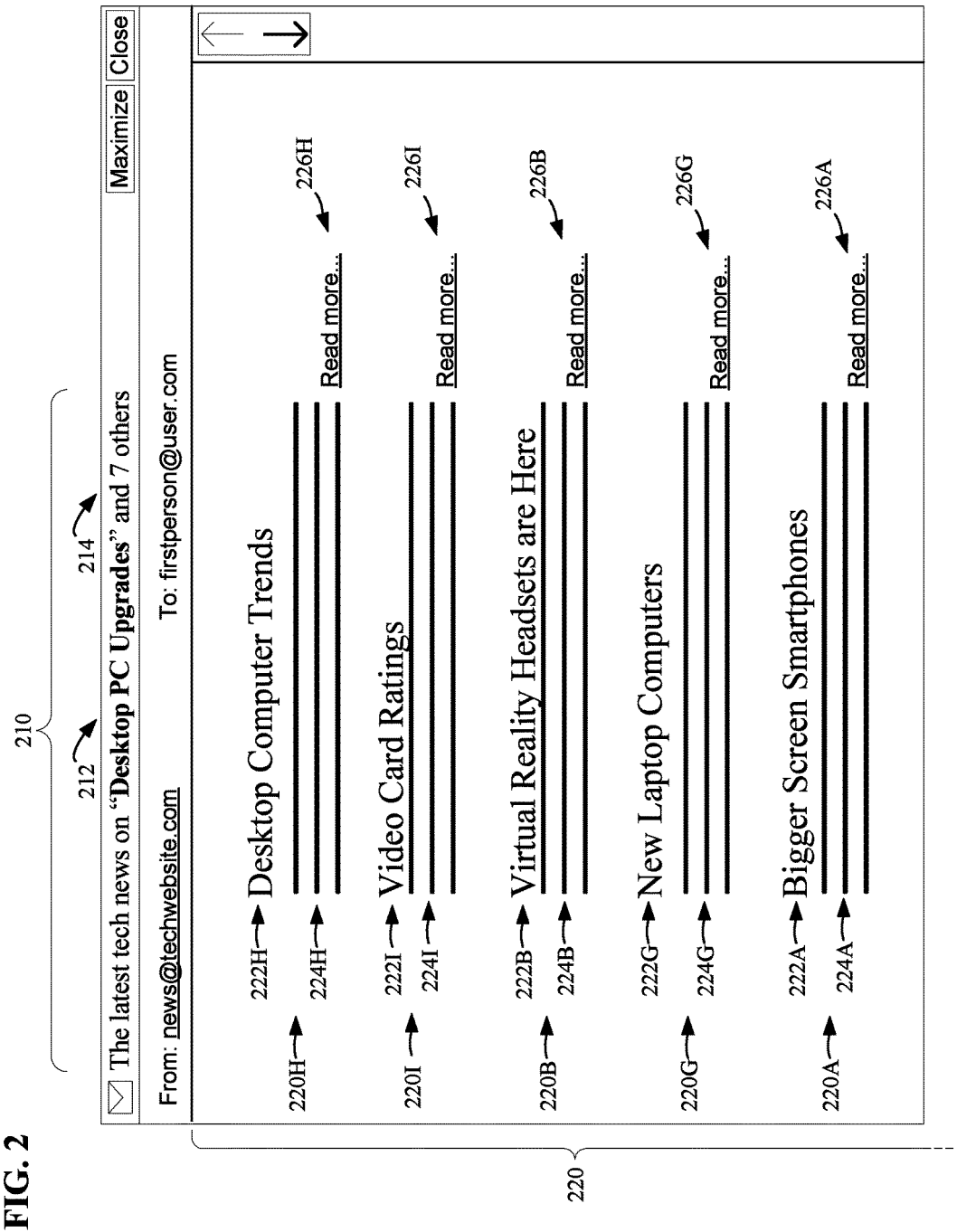
FIG. 2 depicts a message-aggregation altered consistent with embodiments of the present disclosure.

FIG. 2 depicts a message-aggregation 200 altered consistent with embodiments of the present disclosure. The message-aggregation 200 may be a broadcast email (email) sent to a user that is interested in technology. The email 200 may be altered by a BRS consistent with embodiments of the present disclosure. The BRS may operate as one or more services of the provider (e.g., services that monitor the activity of users on the website). The email 200 may come from a provider that specializes in technology-related news and reviews. The provider may provide articles on a website (not depicted). The user may be looking for a new computer that is optimized for the latest in graphics performance, such as a desktop to play computer-games. The email 200 may be displayed by a client, such as an email client running on a computer of the user.

The provider may generate the email 200 based on new technology that staff of the provider research and write about. The email 200 may include a title 210 and a body 220. The title 210 may be altered by the BRS consistent with embodiments of the present disclosure. The email 200 may include the unaltered title "The latest tech news: 10 articles" before being altered by the BRS.

The email 200 may also include ten topics 220 across various aspects of technology. The topics 220 may include Smartphones 220A, Virtual Reality 220B, Smartwatches (not depicted), Autonomous Vehicles (not depicted), Tablets (not depicted), Phone Chargers (not depicted), Laptop Computers 220G, Desktop Computers 220H, Video Cards 220I, and Ergonomic Desks (not depicted). The topics 220 may be in the email 200 in the aforementioned order before alteration by the BRS. Each of the topics 220 may be related to one or more articles (not depicted) on the provider's website. Each of the topics 220 may include: a heading 222 (including headings 222A, 222B, 222G, 222H, and 222I); a summary 224 (including summaries 224A, 224B, 224G, 224H, and 224I); and a link 226 (including links 224A, 224B, 224G, 224H, and 224I). The summary 224 may be a snippet of the article, such as the first paragraph of the article, some pictures, or a summary. The link 226 may be a pointer to the article (e.g., a hyperlink pointing to a universal resource location of the article on the provider's website).

The email 200 may be customized based on user activity of the user. The customizations may be transparent to the user such that the user never sees the unaltered email. In detail, the user may be trying to build a new desktop computer. The user may search using a search engine for terms related to building a computer, such as "PC", "Upgrades", "Desktop", and "Graphics Cars." The user may also read an article on the website of the provider covering the topic of "Virtual Reality Games". The user may also share an article about "Workstation Video" on a social media website of the user. The user's various activities online may be collected and analyzed by the BRS. The BRS may be aware of the user's activity due to one or more credentials that were given to the provider when the user signed up to receive email.

The BRS may identify a subset of the topics 220 that are related to the user activity of the user. The BRS may rank certain topics as highly related to the user activity, while ranking other topics as less related. For example, the BRS may rank topics 220H and 220I by identifying a high correlation between the user activity and terms within the headings 222H and 222I, and summaries 224H and 220I, respectively. Furthering the example, the BRS may rank topics 220B and 220G as having a moderate correlation to the user activity of the user. The other topics (including topic 220A and the topics that are not depicted) may be ranked as having a low correlation to the user activity of the user.

The BRS may customize the unaltered title "The latest tech news: 10 articles" by inserting terms 212 that are relevant to the user activity. The terms 212 may be based on the topics 220 of the email 200. The terms 212 may also be based on the user activity of the user. The terms 212 may be based on the topics 220 that were identified as highly related to the user activity. The BRS may distinguish the terms 212 from the rest of the title (e.g., highlighting, underlining, bolding, font changes, etc.). The BRS may also alter an existing sub-element 214 of the title (e.g., by counting topics 220 that are not highly related as 'others'). The BRS may also alter the topics 220 of the email 200. The BRS may perform the alteration by reordering the topics 220 based on the rankings of the topics (e.g., topics highly related to the user activity before lesser related topics).

Figure 3:
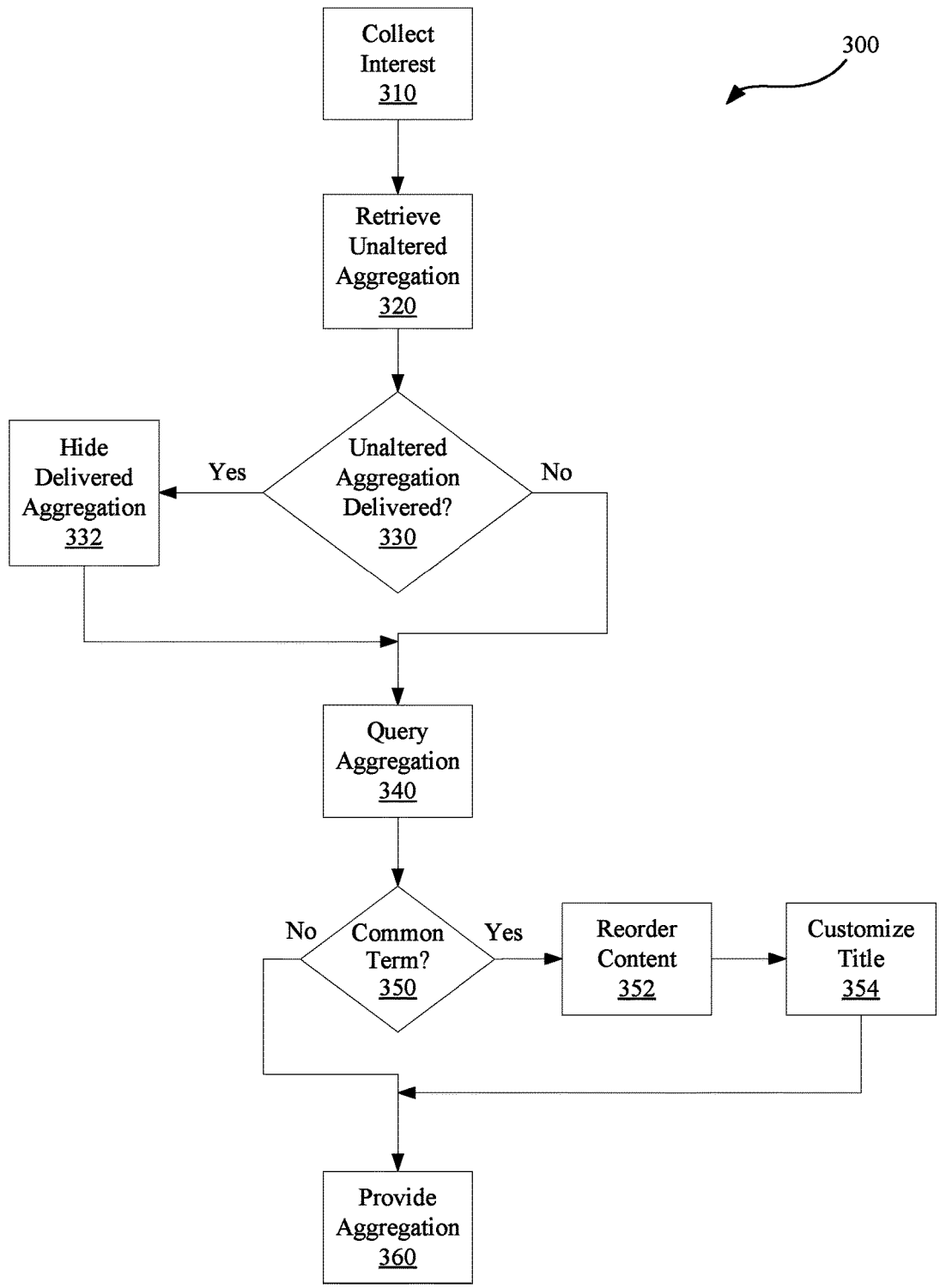
FIG. 3 depicts a method for altering a message-aggregation based on user interests consistent with embodiments of the present disclosure.

FIG. 3 depicts a method 300 for altering a message-aggregation (message) based on user interests, consistent with embodiments of the present disclosure. The message-aggregations may be in the form of a broadcast email (e.g., an email containing a plurality of topics sent to numerous users). The method 300 may be executed by a provider of message-aggregations from a computer of the provider. In some embodiments, the method 300 may be executed by a user that receives message-aggregations (e.g., a client of the user may perform alterations to message-aggregations as needed). In some embodiments, the method 300 may be executed by a third-party (e.g., a web-based email client may be alter emails). In some embodiments, parts of the method 300 may be performed cooperatively by some or all of a provider, a user's client, and a third party. The method 300 may be executed by a BRS and may contain the operations disclosed or may contain other operations not disclosed.

Method 300 begins as interests are collected (per operation 310). The interests may be collected (per 310) from a personal computer of the user (e.g., from a desktop web-browsing client), as the users looks at various interests on the Internet. The interests may be collected (per 310) from a portable computer of the user (e.g., from smartphone apps on a user's smartphone), as the users looks at various online interests. The interests may be collected (per 310) from online activity of the user (e.g., searches provided to search engines, posts to social media of the user). Method 300 may recognize what information to collect based on a credentials provided by the user (e.g., username, password, forum names, social media names, etc.).

A particular unaltered message-aggregation may be retrieved (per operation 320). The unaltered message-aggregation may be retrieved (per 320), from a message server of the provider (e.g., a newly crafted broadcast email from the broadcast email server of the provider). The unaltered message may be retrieved (per 320), from a client of the user (e.g., from the inbox of the user's email client). The unaltered message-aggregation may be retrieved (per 320), from an intermediate third-party (e.g., an Internet Services Provider that uses the Simple Mail Transport Protocol).

It may be determined (per operation 330) if a retrieved unaltered message-aggregation was already delivered. The determination (per 330) may be based on a source of the message-aggregation, such as if the message-aggregation came from a client of the user. The determination (per 330) may be based on a delivery status of the message-aggregation, such as if the message-aggregation was delivered to the user. The determination (per 330) may be based on a user-status of the message-aggregation, such as if the message-aggregation was read by the user. Per operation 332 and if the retrieved unaltered message-aggregation was delivered (per 330), the message-aggregation may be hidden from view of the user.

Per operation 340 the retrieved unaltered message-aggregation may be queried for one or more topics. The query (per 340) may be based on the interests collected (per 310). The query (per 340) may be based on one or more terms common to both the collected interests (per 310) and the retrieved message-aggregation (per 320). The query (per 340) may be based on meta-data of the provider. For example, the provider may have tagged each of the topics in the retrieved message-aggregation with one or more keywords, such as "technology", "health", "education", etc. The collected interests (per 310) may be queried (per 340) with the keywords of the meta-data.

If a common term is found (per operation 350), the retrieved message-aggregation may be altered by reordering of the content (per operation 352). The content reordering (per 352) may include the moving of one or more topics that contain the common terms above those that do not contain common terms. The content reordering (per 352) may include the moving of one or more topics based on related meta-data of the topics. After the content is reordered (per 352), the title of the message-aggregation may be altered (per operation 354). The title may be customized (per 354) by inserting one or more words from the collected interests (per 310). The title may be customized (per 354) by removing certain terms (e.g., terms that were not searched for by the user).

After the title is customized (per 354), the altered message-aggregation may be provided to the user (per operation 360). The altered message-aggregation may be provided (per 360) by being forwarded from the provider's message-aggregation server to the user's client (e.g., from a broadcast email server to an email client of the user). The altered message-aggregation may be provided (per 360) by being sent to a third party (e.g., by being sent to an Internet Service Provider responsible for delivering the message-aggregation on behalf of the provider or the user). If the altered message-aggregation (per 352 and 354) was a hidden delivered message-aggregation (per 332), the message-aggregation may be provided (per 360) by being unhidden. The unhiding of the delivered newly-altered message-aggregation (per 360), may include changing the status of the message-aggregation (e.g., by moving the message-aggregation from a folder to an inbox of the user, by marking the message-aggregation as unread, etc.). If a common term is not found (per 350) the message may be provided (per 360) in an unaltered stated (e.g., with no title changes or content changes). After the message-aggregation is provided (per 360), method 300 may end.

Figure 4:
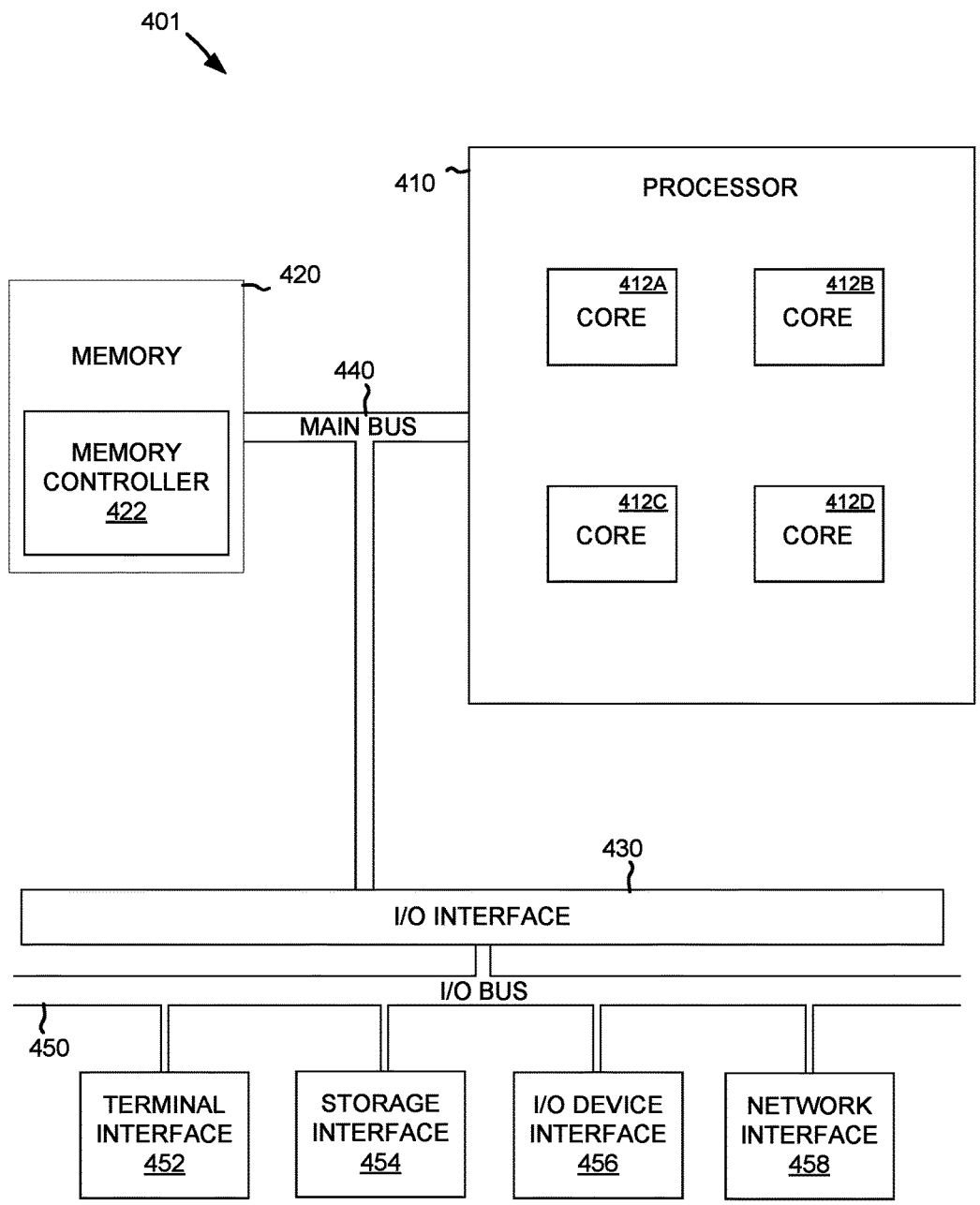
FIG. 4 depicts the representative major components of an example computer system consistent with embodiments of the present disclosure.

FIG. 4 depicts the representative major components of an example computer system 401 that may be used, in accordance with embodiments of the present disclosure. It is appreciated that individual components may vary in complexity, number, type, and\or configuration. The particular examples disclosed are for example purposes only and are not necessarily the only such variations. The computer system 401 may comprise a processor 410, memory 420, an input/output interface (herein I/O or I/O interface) 430, and a main bus 440. The main bus 440 may provide communication pathways for the other components of the computer system 401. In some embodiments, the main bus 440 may connect to other components such as a specialized digital signal processor (not depicted).

The processor 410 of the computer system 401 may be comprised of one or more cores 412A, 412B, 412C, 412D (collectively 412). The processor 410 may additionally include one or more memory buffers or caches (not depicted) that provide temporary storage of instructions and data for the cores 412. The cores 412 may perform instructions on input provided from the caches or from the memory 420 and output the result to caches or the memory. The cores 412 may be comprised of one or more circuits configured to perform one or methods consistent with embodiments of the present disclosure. In some embodiments, the computer system 401 may contain multiple processors 410. In some embodiments, the computer system 401 may be a single processor 410 with a singular core 412.

The memory 420 of the computer system 401 may include a memory controller 422. In some embodiments, the memory 420 may comprise a random-access semiconductor memory, storage device, or storage medium (either volatile or non-volatile) for storing data and programs. In some embodiments, the memory may be in the form of modules (e.g., dual in-line memory modules). The memory controller 422 may communicate with the processor 410, facilitating storage and retrieval of information in the memory 420. The memory controller 422 may communicate with the I/O interface 430, facilitating storage and retrieval of input or output in the memory 420.

The I/O interface 430 may comprise an I/O bus 450, a terminal interface 452, a storage interface 454, an I/O device interface 456, and a network interface 458. The I/O interface 430 may connect the main bus 440 to the I/O bus 450. The I/O interface 430 may direct instructions and data from the processor 410 and memory 420 to the various interfaces of the I/O bus 450. The I/O interface 430 may also direct instructions and data from the various interfaces of the I/O bus 450 to the processor 410 and memory 420. The various interfaces may include the terminal interface 452, the storage interface 454, the I/O device interface 456, and the network interface 458. In some embodiments, the various interfaces may include a subset of the aforementioned interfaces (e.g., an embedded computer system in an industrial application may not include the terminal interface 452 and the storage interface 454).

Logic modules throughout the computer system 401—including but not limited to the memory 420, the processor 410, and the I/O interface 430—may communicate failures and changes to one or more components to a hypervisor or operating system (not depicted). The hypervisor or the operating system may allocate the various resources available in the computer system 401 and track the location of data in memory 420 and of processes assigned to various cores 412. In embodiments that combine or rearrange elements, aspects and capabilities of the logic modules may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for altering a broadcast email to enhance user engagement, the method comprising:
    scanning, by an email client executed by a desktop computer of a first user, a web-browsing database for a first topic of the first user, wherein the email client operates as a stand-alone program on the desktop computer and independent of the first user, the web-browsing database populated with activity of the first user while using a web-browser, the web-browsing database populated by a daemon that runs on the desktop computer of the first user;
    collecting, by the email client, the first topic;
    retrieving, by the email client, the broadcast email from a first folder of the email client, the broadcast email including a plurality of messages and a title, the broadcast email generated by a content provider before retrieval;
    determining the broadcast email is delivered to the user;
    hiding, based on the determining the broadcast email is delivered to the user, the unaltered broadcast email;
    detecting, by the email client and based on the first topic, a relevant first message in the plurality of messages;
    reordering, by the email client and based on the detected relevant first message, the plurality of messages of the broadcast email such that the relevant first message is above the plurality of messages other than the first message;
    inserting, by the email client and based on the detected relevant first message, a term into the title of the broadcast email; and
    altering, by the email client and based on the detected relevant first message, the title format of the broadcast email.

2. A system for altering a broadcast email to enhance user engagement, the system comprising:
    a memory;
    a processor communicatively coupled to the memory, the processor configured to perform a method comprising:
        scanning, by an email client of a portable computer of a first user, a web-browsing database for a first topic of the first user, wherein the email client operates as a stand-alone program on the portable computer and independent of the first user, the web-browsing database populated with activity of the first user while using a web-browser;
        collecting, by the email client, the first topic;
        retrieving, by the email client, the broadcast email from a first folder of the email client, the broadcast email including a plurality of messages and a title, the broadcast email generated by a content provider before retrieval;
        detecting, by the email client and based on the first topic, a relevant first message in the plurality of messages;
        reordering, by the email client and based on the detected relevant first message, the plurality of messages of the broadcast email such that the relevant first message is above the plurality of messages other than the first message, wherein the reordering is based on a ranking of a plurality of topics including the first topic;
        inserting, by the email client and based on the detected relevant first message, a term into the title of the broadcast email; and altering, by the email client and based on the detected relevant first message, the title format of the broadcast email.

3. A system for altering a broadcast email to enhance user engagement, the system comprising:
- a memory;
- a processor communicatively coupled to the memory, the processor configured to perform a method comprising:
  - scanning, by a web-based email client of a first user, a web-browsing database for a first topic of the first user, the web-browsing database populated with activity of the first user while using a web-browser, wherein the web-browser operates as a process executing on a computer of the first user, and wherein the email client operates as a stand-alone program and independent of the first user;
  - collecting, by the email client, the first topic;
  - retrieving, by the email client, the broadcast email from an inbox of the first user, the broadcast email including a plurality of messages and a title, the broadcast email generated by a content provider before retrieval;
  - determining the broadcast email is delivered to the user;
  - hiding, based on the determining the broadcast email is delivered to the user, the unaltered broadcast email;
  - detecting, by the email client and based on the first topic, a relevant first message in the plurality of messages;
  - reordering, by the email client and based on the detected relevant first message, the plurality of messages of the broadcast email such that the relevant first message is above the plurality of messages other than the relevant first message; and
  - inserting, by the email client and based on the detected relevant first message, a term into the title of the broadcast email.

4. The method of claim 1, wherein the reordering the plurality of messages of the broadcast email is based on a ranking of a plurality of topics including the collected first topic of the first user.

5. The system of claim 2, wherein the method further comprises:
- determining the broadcast email is delivered to the user; and
- hiding, based on the determining the broadcast email is delivered to the user, the unaltered broadcast email.

* * * * *